Figure 5:
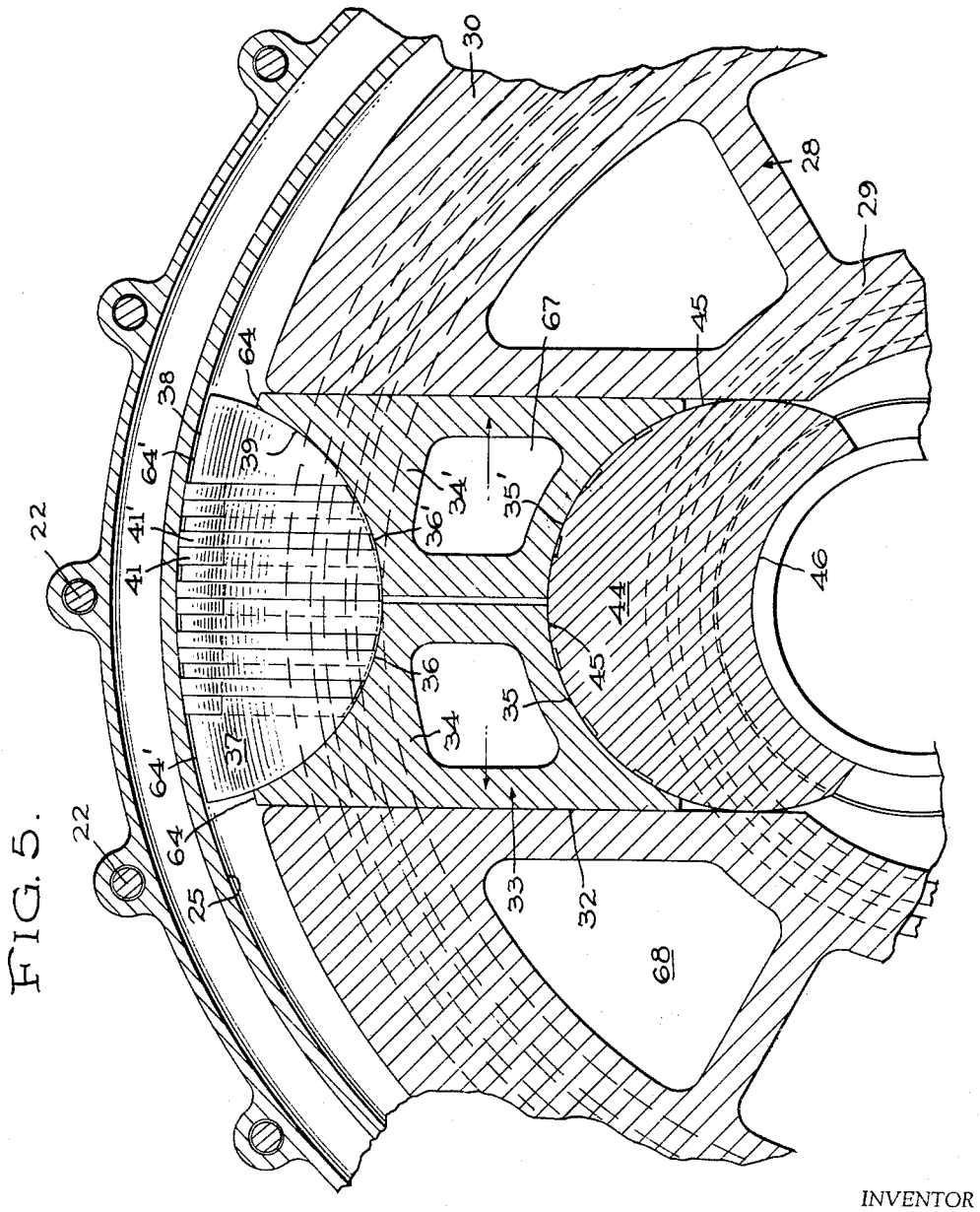

Feb. 11, 1964
J. HOVORKA
3,120,921
AUTOMATICALLY ADJUSTING AND COMPENSATING
SEAL MEANS FOR ROTARY MACHINES
Filed July 25, 1961
5 Sheets-Sheet 1
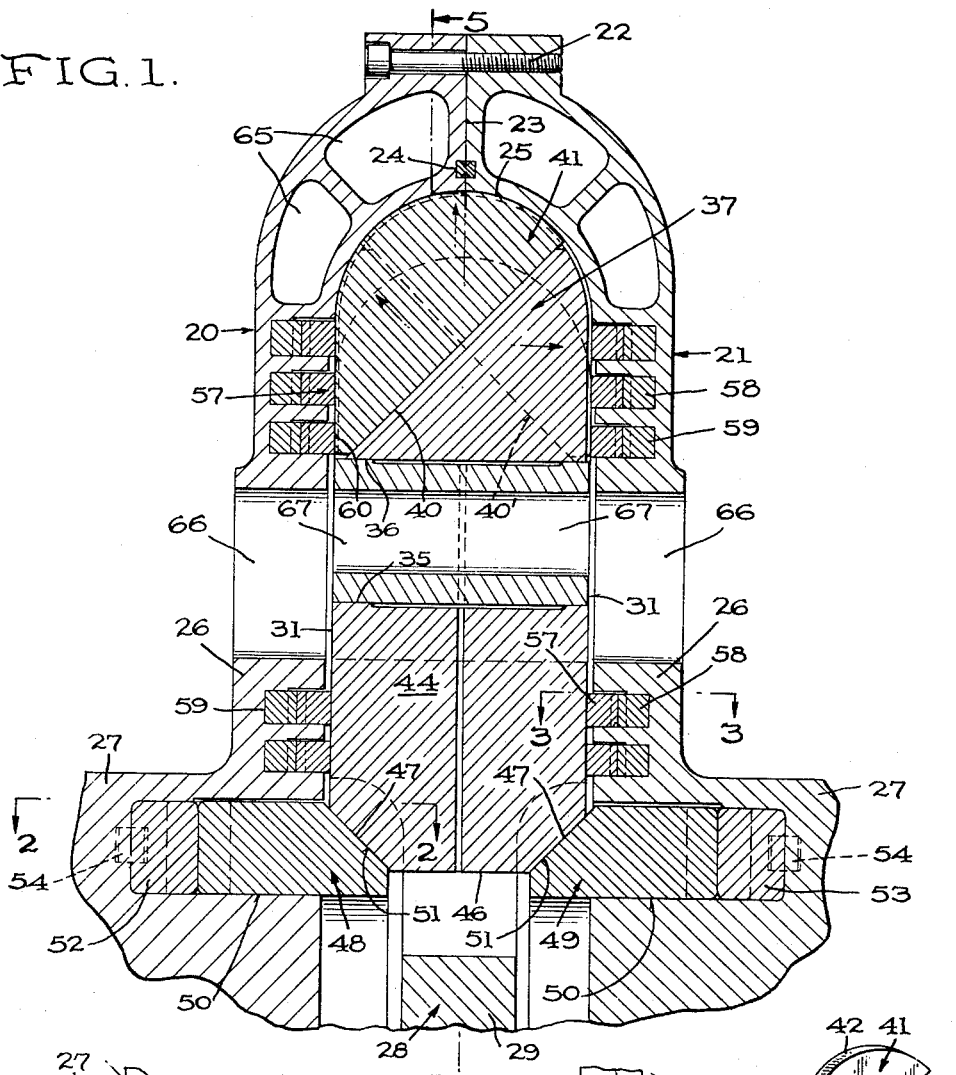
FIG. 1.
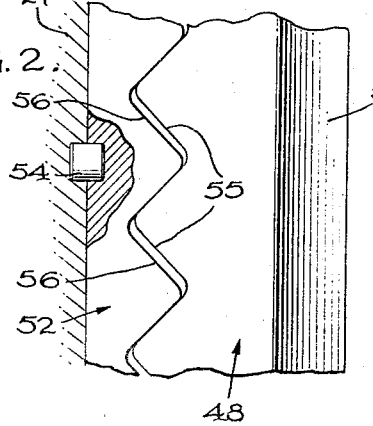
FIG. 2.
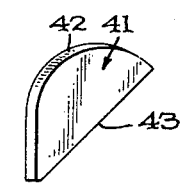
FIG. 3.
FIG. 4.
INVENTOR
JIRI HOVORKA
BY B. P. Fishburne Jr.
ATTORNEY INVENTOR
JIRI HOVORKA
BY B. P. Fishburne, Jr.
ATTORNEY INVENTOR
JIRI HOVORKA
BY B. P. Fishburne, Jr.
ATTORNEY Feb. 11, 1964

J. HOVORKA 3,120,921

AUTOMATICALLY ADJUSTING AND COMPENSATING
SEAL MEANS FOR ROTARY MACHINES

Filed July 25, 1961

5 Sheets-Sheet 4

INVENTOR
JIRI HOVORKA

BY B.P. Fishburne, Jr.

ATTORNEY

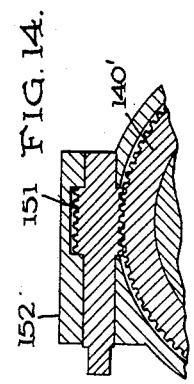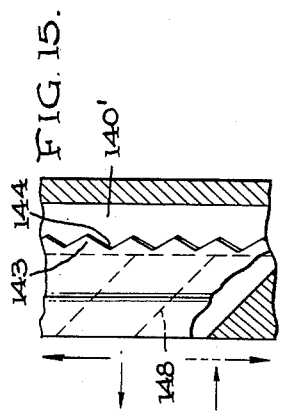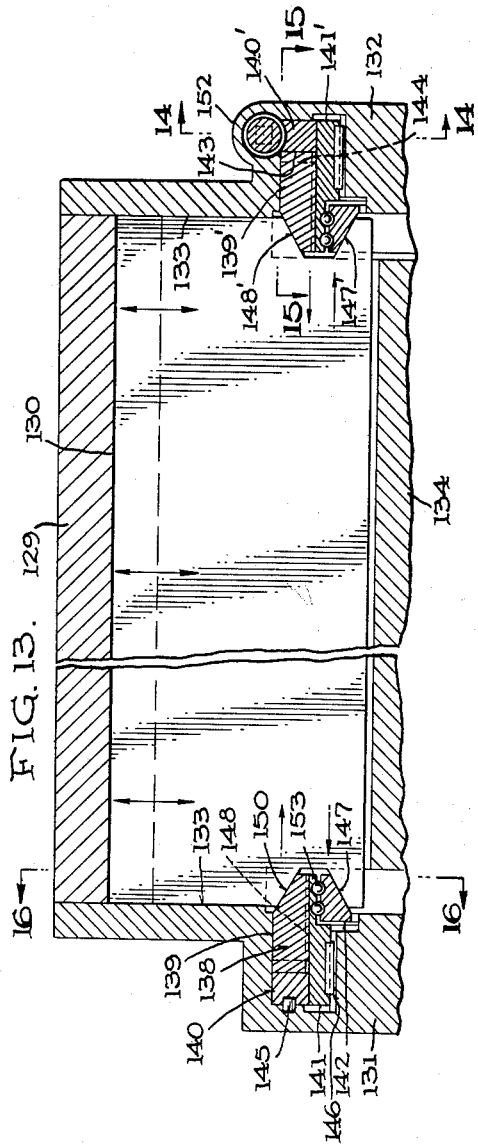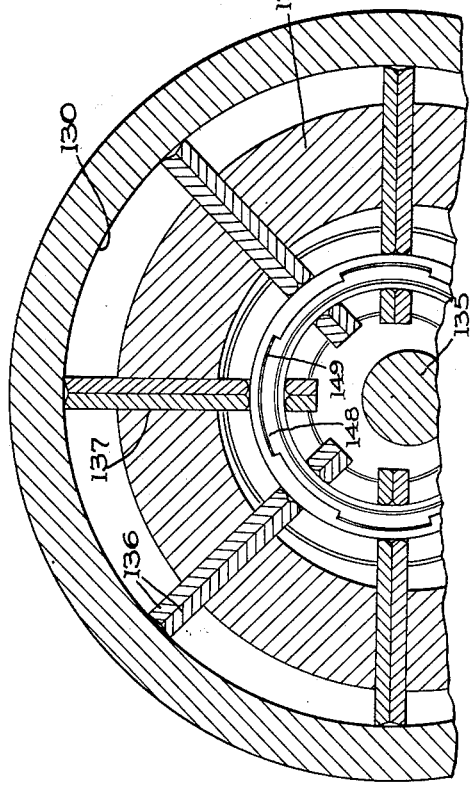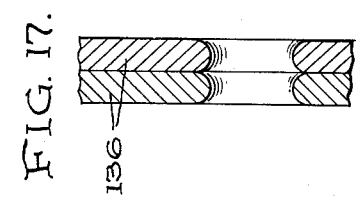

United States Patent Office 3,120,921
Patented Feb. 11, 1964

3,120,921
AUTOMATICALLY ADJUSTING AND COMPENSATING SEAL MEANS FOR ROTARY MACHINES
Jiri Hovorka, Morris Plains, N.J., assignor to Royalty Holding Corporation, Morris Plains, N.J., a corporation of New Jersey
Filed July 25, 1961, Ser. No. 126,589
5 Claims. (Cl. 230—145)

This invention relates to sealing means for rotary machines such as rotary internal combustion engines and the like.

A primary object of the invention is to provide positive, pressure tight sealing means for rotary internal combustion engines, air compressors, pumps, blowers, transmission devices and other rotary motors and machines, which means possesses the following attributes:

(1) Automatically compensating for thermal expansion and contraction during operation;

(2) Automatically compensating for wear on moving parts during operative life;

(3) Remains effective and efficient under high combustion pressure and/or temperature, or high temperature caused by friction or other mechanical work;

(4) Possesses self-lubricating characteristics;

(5) Avoids the use of springs or spring-like devices and like means which are adversely effected by high temperatures;

(6) Adapted to utilize the pressure of combustion or compression (in an engine or the like) to counteract centrifugal force and minimize wear while insuring adequate sealing;

(7) Embodies parts practical and economical to produce and easy to assemble and maintain;

(8) Requires a minimum of maintenance, repair and replacement of parts while assuring a long life of efficient service.

Rotary machines of the prior art in general, and particularly rotary internal combustion engines, have consistently failed to be commercially practical because of inadequate sealing means or sealing means capable of satisfying the above-enumerated requirements, which are the objectives of the present invention. The prior art attempts to satisfy the above objectives have failed for various reasons, such as the use of spring devices which cannot stand up under high temperature conditions, inadequate cooling means, inadequate lubrication or failure of lubrication or the employment of hydraulic or like sealing means which are prohibitively expensive and impractical to build and maintain.

Prior art engine and other rotary machine seals using organic materials and the like have also been unsatisfactory under the influence of heat and high speeds and pressures, and these and other factors inherent in modern day rotary machines have rendered the prior art sealing developments substantially useless for the purposes contemplated under the present invention.

According to the present invention, angular coefficients and coefficients of friction are utilized in combination as the basis for obtaining the desired sealing and automatic compensating characteristics. In all embodiments of the present invention, coefficients of friction are controlled by the provision of mathemffiatically proper surface contact areas between relatively moving parts, and appropriate angular coefficients are employed to regulate the forces which are transmitted through contacting inclined surfaces.

The sealing principles of the invention are applicable to any one or to a combination of the following rotary machine design characteristics:

(1) Cylindrical housing bore enclosing cylindrical rotary on shaft concentric to rotor and eccentric to housing;

(2) Non-cylindrical housing bore and non-cylindrical rotor on shaft concentric to housing and eccentric to rotor;

(3) Rotor vanes reciprocating relative to rotor;

(4) Non-reciprocatory rotor vanes;

(5) Housing race with square shoulders;

(6) Housing with arcuate race;

(7) Two piece housing or three piece housing.

Additional objects and advantages of the invention will be apparent during the course of the following detailed description.

Figure 6:
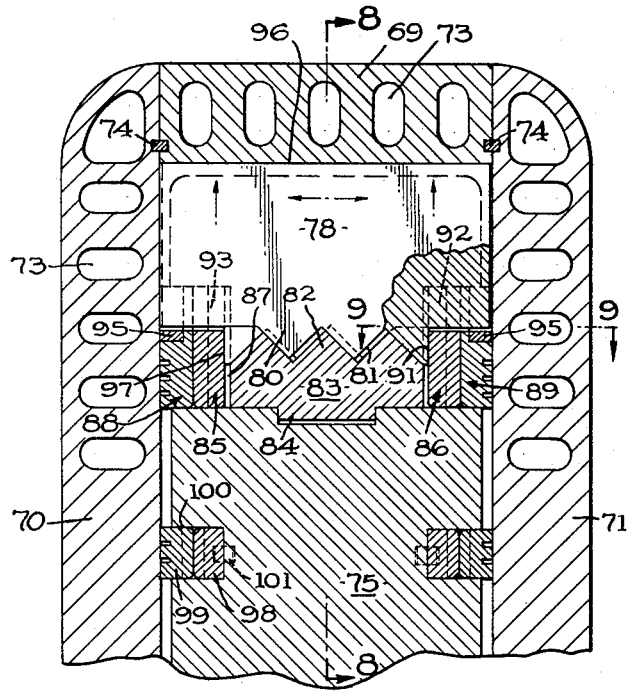
Figure 8:
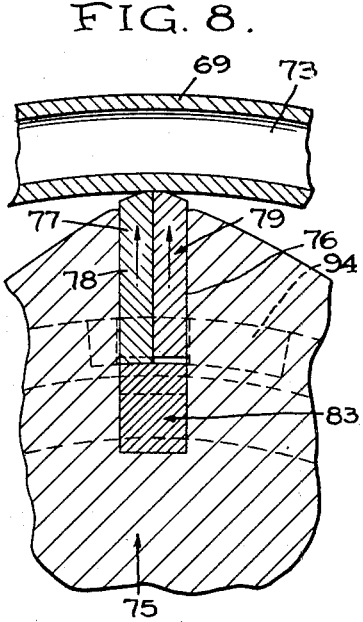
Figure 7:
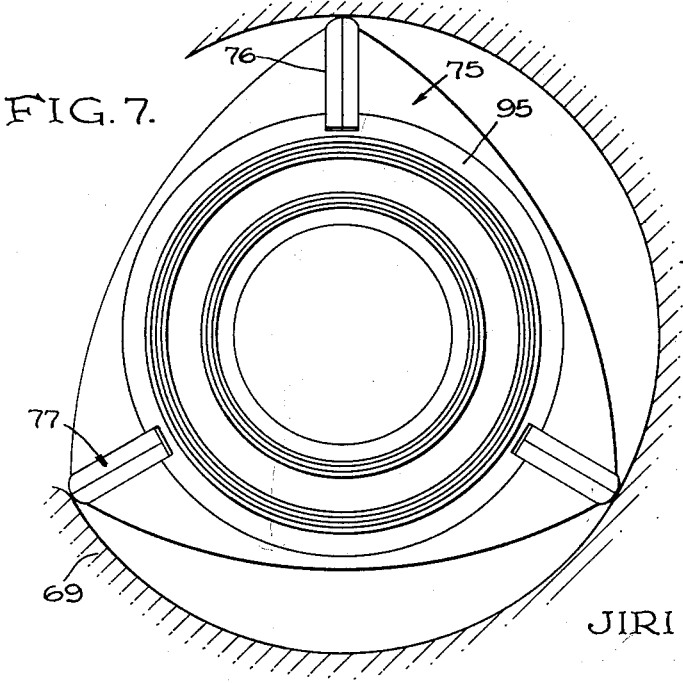
Figure 9:
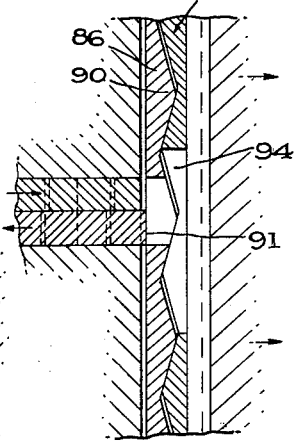
Figure 10:
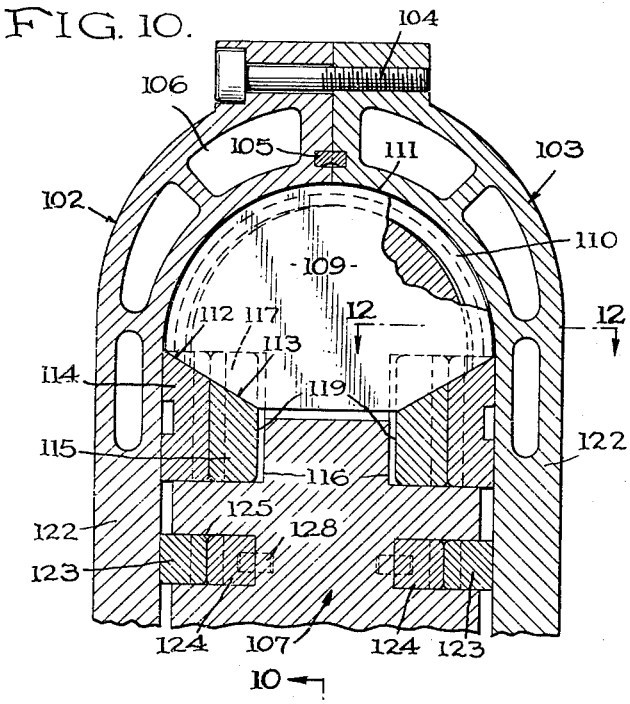
Figure 12:
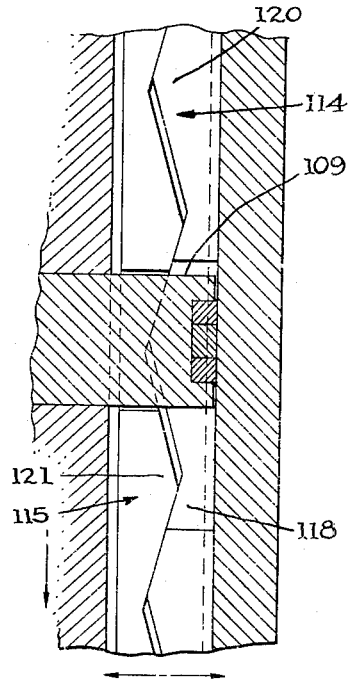
Figure 11:
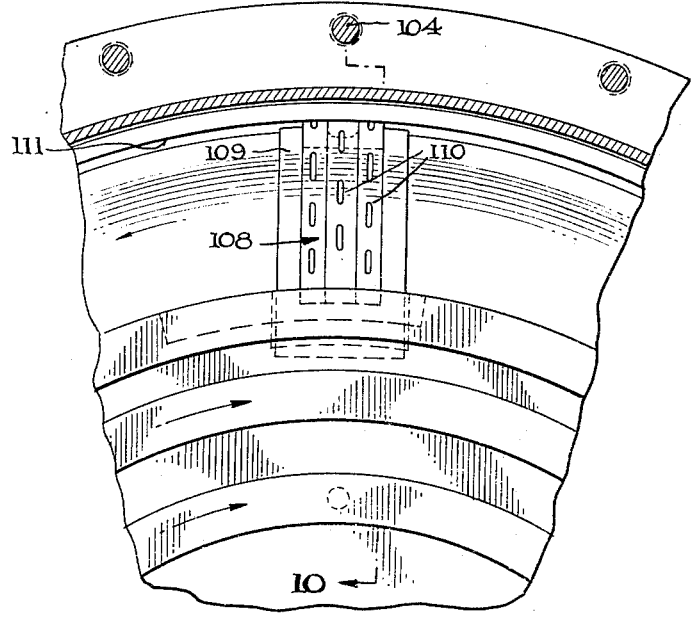

In the accompanying drawings forming a part of this application and in which like numerals are employed to designate like parts throughout the same, FIGURE 1 is a fragmentary radial cross section through a rotary internal combustion engine embodying one form of the invention, FIGURE 2 is a fragmentary plan view, partly in section, of automatically compensating ring means employed in the engine and taken substantially on line 2—2 of FIGURE 1, FIGURE 3 is a similar fragmentary view taken substantially on line 3—3 of FIGURE 1, FIGURE 4 is a perspective view of a sealing insert or shoe, FIGURE 5 is a fragmentary vertical section taken substantially on line 5—5 of FIGURE 1, FIGURE 6 is a fragmentary radial cross section through a rotary engine and sealing means according to a modification of the invention, FIGURE 7 is an end elevation, partly diagrammatic, showing the rotor and housing bore for the engine illustrated in FIGURE 6, FIGURE 8 is a fragmentary vertical section taken on line 8—8 of FIGURE 6, FIGURE 9 is an enlarged fragmentary horizontal section taken on line 9—9 of FIGURE 6, FIGURE 10 is a fragmentary radial section through an engine and sealing means according to another modification taken substantially on line 10—10 of FIGURE 11, FIGURE 11 is a fragmentary end elevation of the engine and sealing means shown in FIGURE 10 with one housing section removed, FIGURE 12 is an enlarged fragmentary horizontal section taken on line 12—12 of FIGURE 10, FIGURE 13 is a fragmentary radial section through a rotary machine and sealing means according to a still further modification of the invention, FIGURE 14 is a fragmentary vertical section taken on line 14—14 of FIGURE 13, FIGURE 15 is a fragmentary horizontal section taken substantially on line 15—15 of FIGURE 13, FIGURE 16 is a fragmentary vertical section taken on line 16—16 of FIGURE 13, FIGURE 17 is an enlarged fragmentary cross sectional view through rotor vanes forming elements of the machine shown in FIGURES 13 and 16.

In the drawings, wherein for the purpose of illustration are shown preferred embodiments of the invention, attention is directed first to FIGURES 1–5 inclusive, wherein there is shown a rotary internal combustion engine having a two-section cylindrical housing, a cylindrical rotor, a shaft concentric with the rotor and eccentric to the housing, rotor vanes which reciprocate relative to the rotor, and a housing race having a 180 degree arc. In FIGURES 1–5 inclusive, sealing means are shown, whereby appropriate coefficients of friction and angular coefficients are utilized in a novel and simplified manner to effectively seal the illustrated internal combustion engine.

With reference to FIGURES 1–5 in detail, the internal combustion engine comprises companion housing sections 20 and 21 secured together in abutting relation by peripheral fastening means 22 and having opposed flat faces 23 sealed at 24 by a copper sealing ring or the like. The bore or race 25 formed by the assembled housing sections 20 and 21 is arcuate in radial cross section, FIGURE 1, and has preferably a full 180 degrees of arc and constitutes one wall or side of the combustion space of the rotary engine. The housing sections 20 and 21 have generally flat radial end walls 26 and axial hub portions 27 for supporting and journaling the rotor shaft, not shown.

The engine rotor is designated generally by the numeral 28 and comprises a central or hub portion 29 for attachment to the rotor shaft, not shown, and a cylindrical radially extending body portion 30 concentric to the shaft but eccentric to the bore 25 of the housing. The rotor body portion 30 operates between the housing end walls 26, FIGURE 1, and is provided with flat end faces 31, spaced somewhat from the adjacent inner faces of the housing end walls. The rotor body portion 30 has one or more radial pockets 32 in its periphery, FIGURE 5, each receiving a rotor vane assembly 33 therein for rotation with the rotor and radial reciprocation relative thereto during the operation of the engine.

Each rotor vane assembly 33 comprises a central two part vane body 34—34' disposed slidably within the pocket 32 for radial reciprocation and having arcuate recesses 35—35' and 36—36' in the inner and outer ends thereof.

Each vane assembly 33 further embodies an outer shoe 37 having an outer arcuate face 38 to conform to the cross sectional and circumferential face of bore or race 25, and an inner arcuate face 39 conforming to the shape of recess 36—36' and slidable therein. The outer shoe 37 is slotted radially and diagonally as at 40 and 40', FIGURE 1, for the reception of radial plate-like inserts or sealing elements 41 and 41' disposed slidably therein in spaced pairs as best shown in FIGURE 5. Each insert 41 and 41' as shown in FIGURE 4 has an arcuate edge portion 42 to conform to the arcuate race 25 in assembly and a straight diagonal edge 43 to slidably engage the diagonal face of the slot formed in the shoe 37. Any preferred number of pairs of the inserts 41—41' may be provided within each outer shoe 37, such as the five pairs of inserts shown in FIGURE 5 for direct sealing engagement against the bore or race 25. Alternate pairs of inserts 41—41' have their diagonal edges 43 opposed or crossing at right angles as shown in FIGURE 1 for sliding coaction with the diagonal edges 40—40' of the slots in the shoe 37. The entire shoe 37 is rockable within the arcuate recess 36—36' during rotation of the engine rotor 28.

Additionally, each rotor vane assembly 33 embodies an inner shoe 44 separately formed having an outer arcuate face 45 slidably contacting recess 35—35' and an inner arcuate face 46. The shoe 44 is symmetrically formed as shown in FIGURES 1 and 5 and is provided at its inner end on opposite sides of the arcuate face 46 with arcuate tapered cam faces 47 which may be arranged 45 degrees to the axis of the rotor shaft.

An opposed pair of axially shiftable taper rings 48 and 49 are disposed within annular recesses 50 formed in the central portions 27 of housing sections 20 and 21 adjacent to and outwardly of the tapered faces 47 of vane shoe 44. The rings 48 and 49 have opposed tapered faces 51 which slidably engage the tapered faces 47 during operation of the engine.

Axially outwardly of taper rings 48 and 49 are retainer rings 52 and 53, fixedly secured and held against rotation within the annular recesses 50 of the housing sections as by dowel pin means 54.

As best shown in FIGURE 2, each companion pair of rings 48 and 52 and 49 and 53 is provided circumferentially with interfitting tapered portions or teeth 55 and 56, all having the same degree of taper and arranged in sliding frictional engagement. The rings 48 and 52 and 49 and 53 have the interfitting tapered teeth shown in FIGURE 2 extending about their entire peripheries.

In the absence of any counteracting force such as combustion pressure, when the rotor 28 and its shaft are rotated, centrifugal force causes each vane assembly 33 including inner shoe 44, two part vane body 34—34' and outer shoe 37 with inserts 41—41' to slide outwardly in rotor pocket 32, until the inserts 41—41' engage the housing race 25 slidably. All parts of the rotor vane assembly 33 thus move outwardly radially in unison under the influence of centrifugal force. Simultaneously, centrifugal force exerted by the inner shoe 44 against the two part vane body 34—34' urges these parts away from each other laterally in the direction of the arrows, FIGURE 5, and against the radial side walls of rotor pocket 32. This separating action of the vane body parts 34—34' is caused by the wedging action of the arcuate shoe 44 in the arcuate faces 35—35' of the vane body parts. The positive frictional contact between the housing race 25 and total vane assembly 33 and between the vane body parts 34—34' and the rotor is maintained by centrifugal force as long as rotation continues, or until counteracting forces due to combustion are created which tend to force the parts of the vane assembly inwardly.

As soon as engine combustion pressure overcomes centrifugal force and tends to force the vane assembly 33 inwardly, thereby tending to create an undesirable clearance between housing race 25 and the tips of inserts 41—41', the tapered faces 47 of inner shoe 44 firmly engage the correspondingly tapered faces 51 of rings 48 and 49.

Under normal operating conditions, there exists a predetermined coefficient of friction between the inner shoe 44 and taper rings 48 and 49. The inward resultant force on the vane assembly 33 above-described increases this coefficient of friction, thereby tending to rotate the taper rings 48 and 49 with the engine rotor. Due to the tapered interengaging teeth 55 and 56 on the rings 48 and 52 and 49 and 53, the rotational tendency of the rings 48 and 49 under influence of friction from the shoe 44 is translated by the teeth 55 and 56 into inward axial movement of the rings 48 and 49 toward each other and toward the tapered faces 47, FIGURE 1. That is to say, the interfitting teeth 55 and 56 resist rotation of the rings 48 and 49 with the engine rotor, and the camming action of the teeth 55 against the teeth 56 of the fixed retainer rings 52 and 53 causes the taper rings 48 and 49 to shift inwardly axially. Inward movement of the taper rings 48 and 49 as above-described forces the tapered faces 51 against the mating tapered faces 47 of inner shoe 44, thus forcing the complete vane assembly 33 radially outwardly against housing race 25.

As a result, the undesired radial clearance between the housing race and the inserts 41—41' is eliminated, positive contact is obtained between the housing race 25 and the outer shoe assembly 37, and at the same time, positive contact between the top shoe 37 and vane body parts 34—34', the inner shoe 44, taper rings 48 and 49 and retainer rings 52 and 53 is maintained and the coefficient of friction between inner shoe 44 and taper rings 48 and 49 is returned automatically to the desired value. Simultaneously, positive sealing is maintained between vane body parts 34, 34' and the side walls of rotor pocket 32. By virtue of the above-described arrangement, the rotary engine is rendered self-adjusting or compensating by means of controlled forces and without the use of springs or the like to maintain a pressure tight seal at all times between the vane assembly 33 and the housing race 25, notwithstanding thermal changes and normal wear of parts.

Means are provided to simultaneously effectively seal the sides of the rotor 28 with the housing end walls 26 during all conditions of engine operation; such means comprises as shown in FIGURES 1 and 3 a plurality of pairs of coacting floating seal rings 57 and relatively stationary retainer rings 58 arranged as shown in FIGURE 1 upon opposite sides of the engine rotor. Each pair of coacting rings 57 and 58 is pocketed at 59 within an annular recess or groove formed in the housing end wall 26. In FIGURE 1, three such grooves 59 are provided in each housing end wall 26 adjacent the outer combustion area and on opposite sides of the outer shoe 37. Two of the grooves 59 are provided in each end wall 26 at the central area of the engine to seal the liquid lubricant therein.

Each floating seal ring 57 has a flat inner face 60 for sliding frictional contact with the end faces 31 of the rotor body portion and with the corresponding faces of the outer shoe assembly, FIGURE 1. Each retainer ring 58 is pinned or keyed at 61 within its groove 59, and thereby positively held against rotation. Each coacting pair of rings 57 and 58 have interfitting tapering projections or teeth 62 and 63 formed thereon about their entire circumferences, and the opposed faces of these identically tapered teeth are in sliding frictional contact, as best shown in FIGURE 3.

As the rotor 28 rotates, it tends to turn or rotate each floating seal ring 57 in the same direction due to the coefficient of friction therebetween. However, the stationary coacting retainer ring 58 resists rotation of the sealing ring 57 and the interfitting teeth 62 and 63 force the sealing ring 57 inwardly axially so that the latter forms a pressure tight seal against side wall of the rotor regardless of thermal changes and/or wear. The mode of operation in connection with the real rings 57 is generally similar to the mode of operation of the taper rings 48 and 49 in connection with their companion rings 52 and 53.

Any undesirable forces created because of thermal expansion which increases the radial length of the total vane assembly 33 will automatically force taper rings 48 and 49 axially outwardly and toward their mating rings 52 and 53 to maintain the desired coefficient of friction and also provide positive sealing. Likewise, any increase in the lateral width of the vane assembly between the end walls 26 of the housing causes floating sealing rings 57 to shift axially outwardly against retainer rings 58 until the normal coefficient of friction between the sealing rings and rotor is established, with positive sealing maintained. All of the above-described compensating action within the engine is completely automatic without the use of springs or other external forces and without the necessity for mechanical adjustment of parts manually or by power-driven means.

As above-described, pressure tight sealing is maintained under all operating conditions by utilizing appropriate coefficients of friction between relatively movable parts. However, in order to maintain wear between the outer shoe assembly 37 and housing race 25 at a minimum, any centrifugal force in excess of that necessary to maintain pressure tight sealing should be nullified. For any particular engine of the type shown in FIGURES 1–5, the pressure of combustion, mass of the total vane assembly and the top operating rotational speed of the engine can be used to determine whether centrifugal force exerted on the total vane assembly will exceed the combustion pressure to be produced. These factors are subject to mathematical analysis and no guesswork need be involved. In a general way, it may be stated that in rotary internal combustion engines designed for low horsepower ratings, combustion pressure will probably exceed centrifugal forces, and that the higher the power output of the engine, the greater the degree by which centrifugal force will exceed combustion pressure due to the total mass of the vane assemblies carried by the rotor.

A surface of appropriate area can be provided against which the combustion pressure may be exerted, this surface to be located on the outer end surfaces 64 and 64' of the vane body parts 34—34' and outer shoe 37 respectively, FIGURE 5. When so located, combustion pressure can be utilized to counterbalance any undesirable or excessive centrifugal force during the major portion of each revolution of each vane assembly 33 with the rotor 28. In this way, wear will be minimized to the point where a practical operating life will be obtained from the outer shoe assembly 37. The outer shoe assemblies 37 will be the primary parts of the engine designed to experience some inevitable wear, and which parts can be economically made for replacement purposes.

It is recognized that the use of conventional hydrocarbon lubricants in high temperature combustion areas results in the burning of the lubricant to form carbon deposits. Continuous addition of liquid lubricant therefore becomes necessary. Carbon cannot be prevented from mixing with the oil film in the combustion region, and a constant fine abrasive action may result under such conditions producing excessive wear. However, the sealing technique disclosed herein can be designed for self-lubrication in the outer combustion regions of the engine, thus avoiding the need for externally supplied liquid lubricants for the parts subject to high combustion temperatures. Specifically, the outer shoe inserts 41—41' may be pressed out of materials containing embedded graphite. Those surfaces of the outer shoe 37 and inner shoe 44 which engage the vane body 33 can also be embedded or impregnated with graphite or other similar material having dry self-lubricating properties. Those surfaces of the vane body 33 which slide against the rotor 28, and those surfaces of the floating seal rings 57 which engage the rotor can be similarly treated. When thus designed, the outer combustion region of the engine may be operated "dry" with superior lubricating characteristics and absolute minimum wear. The central region of the engine not subject to high combustion temperatures may utilize conventional liquid hydrocarbon lubricants for the shaft bearings and like parts as required. By minimizing wear in this manner, the engaging surfaces of relatively movable parts in the combustion area are maintained in a highly polished smooth condition, thus contributing further to positive sealing.

The self-compensating features of the above sealing technique permit self-adjustment for thermally induced dimensional changes and for wear, as explained. Cooling is therefore not a critical requirement. However, if liquid cooling adjacent the combustion zone is desired, the coolant passages 65 may be arranged in the housing sections 20 and 21 as shown in the drawings and these passages can be connected externally of the housing.

With the outer or combustion zone of the rotary engine completely sealed and self-lubricated, and with the central low temperature zone sealed and containing conventional liquid lubricant, the housing can be further provided with a series of air passages 66 extending about the engine circumferentially and concentric to the rotor shaft, and so located as to permit the passage of air axially through the housing, through additional passages 67 of vane bodies 33 and through passages 68 of the rotor 28, FIGURE 5, thereby cooling the rotor structure and vane assemblies. The major advantage of the air and/or liquid cooling is to minimize the degree of self-compensation required to maintain positive sealing in spite of thermal changes and wear. However, the sealing technique disclosed is capable of compensating for such changes without cooling.

With reference to FIGURES 1, 2 and 3, the arrows shown on the drawings indicate the direction of movement of the various sealing components of the engine toward positive sealing contact with the engine surfaces during the operation thereof, as should now be obvious to anyone skilled in the art.

With reference to FIGURES 6–9 inclusive, a modification of the invention is illustrated showing further application of the self-compensating sealing technique to another type of rotary engine. In FIGURES 6–9, the engine rotor and housing are non-cylindrical, the rotor is concentric with the housing, and the rotor vanes are of a non-reciprocating type. A three section engine housing with a square shouldered race or bore is provided. The same basic sealing principle described in the prior embodiment, FIGURES 1–5, is still present with some modification.

In FIGURES 6–9 inclusive, the engine housing comprises an intermediate body portion 69 and a pair of housing covers or end walls 70 and 71. These elements may be provided with passage means 73 for a suitable liquid coolant. Copper sealing rings 74 are arranged between the several housing sections, FIGURE 6, to provide positive pressure tight seals therebetween. The non-cylindrical engine rotor 75 has a plurality of radial slots or pockets 76 formed therethrough to accommodate a corresponding number of non-reciprocating vane units. Each vane unit or assembly 77 comprises a companion pair of relatively movable plate-like vane bodies 78 and 79 having radially inwardly projecting tapered teeth 80 and 81, engaging and having a camming action with opposed correspondingly tapered teeth 82 of an insert 83 which is common to the particular pair of vane bodies 78 and 79. The insert 83 is keyed at 84 to the engine rotor 75 to rotate therewith, and the vane bodies 78 and 79 within the slots 76 also turn with the rotor. As best shown in FIGURE 6, the vane bodies 78 and 79 are generally rectangular so as to conform to the radial cross sectional shape of the rectangular housing race.

Retainer rings 85 and 86 are positioned in close proximity to the ends of the insert 83 but spaced sufficiently therefrom at 87 to allow the retainer rings to move toward each other axially a desired amount during the operation of the engine. On the outer sides of retainer rings 85 and 86 are disposed floating seal rings 88 and 89. As best shown in FIGURE 9, the adjacent rings 86 and 89 or 85 and 88 are each provided upon their opposed faces with interfitting tapered projections or teeth 90, all having the same degree of taper and slidably contacting one another and extending about the circumferences of the respective rings for cam-like coaction.

With particular reference to FIGURES 6 and 9, it may be observed that the vane body 78 of each vane unit 77 contacts the inner annular surface of the retainer ring 86 at 91. The vane bodies 78 and 79 are both keyed into the retainer ring 86 at 92 to positively prevent rotation of the ring 86 relative to the rotor structure. The other retainer ring 85 is arranged in the identical manner with respect to the vane bodies 78 and 79 and is held or keyed at 93 against rotation relative to the rotor 75. The floating seal rings 88 and 89 have clearance slots 94 formed therethrough to permit some circumferential movement thereof without interference with the vane bodies 78 and 79. Outer seal rings 95 are freely mounted on the outer circumferences of seal rings 88 and 89 to provide sealing between their faces and the vane bodies 78 and 79, FIGURE 7. These outer seal rings 95 form parts of the floating seal rings 88 and 89.

As the rotor 75 turns upon its shaft axis, the coefficient of friction existing between the outer faces of floating seal rings 88 and 89 and the inner faces of housing sections 70 and 71 tends to retard their rotary movement, causing the tapered teeth 90 of retainer rings 85 and 86 to establish contact with the corresponding teeth of seal rings 88 and 89 and to shift axially inwardly toward the ends of insert 83, FIGURES 6 and 9. The inward movement of retainer ring 86 causes vane body 78 engaging the same at 91 to shift or slide radially toward the housing race 96 and axially or laterally toward housing section 70 due to contact between the tapered teeth 80 of vane body 78 and the interfitting teeth 82 of insert 83. Correspondingly, inward axial movement of retainer ring 85 toward insert 83 and under influence of seal ring 88 causes radial movement of vane body 79 outwardly toward housing race 96 and axially or laterally toward the inner face of housing section 71 because of contact between the inner side of ring 85 and vane body 79 at 97, FIGURE 6. This compound shifting of vane body 79 by retainer ring 85 is further effected by the sliding engagement of the vane body tapered teeth 81 with the adjacent sides of tapered teeth 82 of the relatively stationary insert 83.

The vane bodies 78 and 79 will thus slide radially outwardly and laterally in their respective directions indicated by the arrows in FIGURES 6, 8 and 9 until they make positive sealing contact against the inner faces of housing sections 69, 70 and 71 defining the rectangular race of the housing. It should be noted in this connection that the teeth 80, 81 and 82 of vane bodies 78 and 79 and insert 83 can only be tapered at 45 degree angles to the axis of the rotor 75, so as to provide equal take-up or movement of the two vane bodies 78 and 79. However, the mating tapered teeth 90 of rings 86 and 89 and 85 and 88 may utilize any desired identical degree of taper or angular coefficient, in combination with the coefficient of friction between the respective rings which may be found functionally desirable. The described construction and mode of operation provides pressure tight sealing of each combustion space in the engine between adjacent vane units 77, and the sealing construction is self-adjusting or compensating for wear and thermal expansion as in the prior form of the invention. The same type of dry lubrication by graphite impregnation of parts or the like described in the prior embodiment of the invention may be used for the engine of FIGURES 6 through 9 in the combustion area adjacent the vane units 77 and associated elements.

Also similarly to the arrangement described in the prior form of the invention, particularly FIGURE 3, the central area of the engine remote from the combustion zone may be sealed by the use of relatively stationary retainer rings 98 and matching seal rings 99 having interfitting tapered teeth. These pairs of rings are seated within annular grooves 100 of the rotor 75 and the innermost retainer rings 98 are pinned to the rotor at 101, while the sealing rings 99 have sliding frictional contact with the inner faces of housing sections 70 and 71.

Referring now to FIGURES 10–12 in the drawings, a further embodiment of the same basic invention is shown, whereby angular coefficients and coefficients of friction are utilized for positive pressure tight sealing upon a rotary engine which includes a housing having two sections 102 and 103, connected as at 104 and having therebetween a copper seal ring 105 to provide positive sealing for the two part housing. The housing sections may be provided with liquid coolant passages 106, as shown. The two part housing in FIGURES 10–12 is non-cylindrical and the rotor 107 is non-cylindrical and is concentric to the housing. The rotor vane assembly 108 is non-reciprocating and consists of a vane body 109 and one or more vane body seals 110 seated within a groove in the outer arcuate face of the vane body 109. The housing race 111 is arcuate through 180 degrees in radial cross section, FIGURE 10.

The vane body seals 110 are comparable to the piston rings of conventional piston engines insofar as concerns permanent resilient expansion characteristics under internal combustion engine operating temperatures. As shown in FIGURE 10, the vane body 109 and seals 110 have aligned inner tapered faces 112 and 113 which are in contact with correspondingly tapered faces of floating seal rings 114 and seal retainer rings 115, mounted on the opposite side faces of rotor 107 in suitable annular recesses 116. As in the next preceding form of the invention, FIGURES 6–9, vane body 109 is positively keyed to retainer rings 115 as at 117 to prevent these rings from rotating relative to the rotor structure. The floating seal rings 114 have circumferential clearance cutouts or slots 118 formed therethrough to permit some rotary movement thereof without interference from the vane body 109, FIGURES 11 and 12. Although the retainer rings 115 are held against rotary movement, a clearance space 119 is provided at the inner sides thereof which permits them to shift axially inwardly toward the radial center line of vane assembly 108 as may be best seen in FIGURE 10.

As shown in FIGURE 12, the rings 114 and 115 have matching interfitting tapered teeth 120 and 121 formed on their closed faces similar to the prior embodiments. As the rotor 107 turns with its shaft, a coefficient of friction between seal rings 114 and the housing end walls 122 tends to retard their rotation, with the result that the tapered teeth 120 and 121 slidably coact and cause each retainer ring 115 to shift axially inwardly within the space 119, thereby forcing vane body 109 radially outwardly due to engagement of the tapered faces 113 thereof with the correspondingly tapered faces of the retainer rings. This action causes the resilient vane body seals 110 to have positive sealing contact with the full arc of the housing race 111. This therefore provides complete positive sealing of the outer combustion zone of the engine and the sealing means is automatically compensating for wear and thermal changes, as previously explained.

As in the prior embodiments, side floating seal rings 123 and coacting retainer rings 124 are carried in annular grooves 125 of the rotor 107, the rings 124 being pinned to the rotor at 126. By this means, as previously explained in detail, the sides of the rotor are sealed to the housing end walls 122 at the inner regions of the engine. While the vane body seals 110 have been described as comparable to piston rings, it is equally practical to form them of materials having the self-lubricating characteristics described in the prior embodiments of the invention.

In FIGURES 13–17 inclusive, there is shown still another modification of the invention embodying the same basic principles and techniques of the prior forms relating to rotary engines. The embodiment shown in FIGURES 13–17 applies to other rotary machines such as blowers and compressors, in which combustion pressures are not involved, but positive sealing is equally important to obtain the greatest possible efficiency. The high rotational speeds and the weight of the vanes used in such rotary machines create high centrifugal forces exerted by the vanes against the housing race. As a result, undesirable friction between the moving vanes and housing causes excessive wear to occur, particularly because adequate lubrication is difficult or impractical to achieve.

While there are obvious and relatively simple means by which the centrifugal forces could be transferred from the housing race, such means have not heretofore permitted any adjustment or alignment of the vanes, either automatic or manual, to compensate for wear and/or thermally induced changes, and therefore have not been generally adopted.

The general technique previously-described in this application for the positive sealing of rotary combustion engines provides a simple, practical means of controlling vane alignment and contact pressure of the vanes on the housing race while at the same time compensating automatically for wear and for thermal expansion and contraction.

With reference to FIGURE 13, substantially identical vane alignment and adjustment assemblies are arranged upon opposite sides of a rotary machine having an intermediate cylindrical housing section 129 with cylindrical race 130 and housing end sections or plates 131 and 132 with inner parallel flat faces 133 perpendicular to the race 130. A cylindrical rotor 134 is carried by a shaft 135 eccentric to the housing race 130, FIGURE 16, and a plurality of sets of radial vanes 136 are mounted in radial slots 137 formed through the rotor in circumferentially spaced relation, as shown.

With reference to the left-hand portion of FIGURE 13, a self-compensating vane alignment and adjustment assembly 138 is shown, which includes a vane positioning ring 139, a coacting retainer ring 140, an axially sliding ring 141 and a tapered sleeve bearing 142, as indicated. The rings 139 and 140 have interfitting equally tapered teeth 143 and 144, FIGURE 15, and the retainer ring 140 is pinned at 145 in fixed relation to the housing section 131 and thereby held against rotation with the rotor 134. The sliding ring 141 is keyed at 146 to the housing section 131 so that it cannot rotate but is free to slide axially of the rotor. The assembly 138 is mounted as shown within a recess in the inner face of housing section 131, in a position concentric to the housing race 130. The assembly 138 protrudes axially inwardly of the flat face 133 for controlling the position of the vanes 136 and thereby controlling the degree of pressure exerted by the tips of the vanes against the race 130.

The centrifugal forces exerted on the vanes 136 during rotation are transferred to the housing walls or sections 131 and 132 via the tapered sleeve bearings 142 and the sliding rings 141. For a given rotary machine, a definite angle is selected for the tapered face 147 of sleeve bearing 142 so that when the machine is operating at its optimum constant r.p.m., a predetermined force is exerted to move sliding ring 141 axially outwardly away from vanes 136. The sliding ring 141 is provided upon its periphery with a plurality of helical keyways or guideways 148 arranged at a selected angle to its direction of axial motion, FIGURE 15. Vane positioning ring 139 is slidably keyed to the ring 141 by coacting interfitting keyways 149 formed in its bore, with the result that outward axial movement of sliding ring 141 will cause vane positioning ring 139 to rotate a limited extent cricumferentially within the annular recess which contains the assembly 138. When the vane positioning ring 139 is caused to rotate, the sliding interengaging tapered teeth 143 and 144 force the ring 139 axially inwardly to maintain positive contact with the tapered surface 150 of vanes 136, FIGURE 13. This in turn causes vanes 136 to maintain controlled positive sealing engagement with the housing race 130 in spite of wear or thermally induced dimensional changes, and this mode of operation is generally similar to that described in the prior embodiments of the invention.

While this method of vane positioning is automatically compensating for changes in machine operating conditions, it is feasible to provide an external manual adjustment for the same changes and thereby causing the retainer ring 140 to be rotated the necessary distance to obtain proper vane alignment, and this feature is illustrated at the right-hand side of FIGURE 13 and also in FIGURE 14.

Referring to these figures, the periphery of retainer ring 140′ has gear teeth formed thereon, engaging the teeth of a worm gear 151 mounted within a boss extension 152 of right-hand housing section 132. Manual turning of this worm gear 151 causes rotation of retainer ring 140′ and at the same time, vane positioning ring 139′ will slide due to the interengagement of tapered teeth 143 and 144, FIGURE 15, and therefore move axially inwardly or outwardly, depending upon the direction of rotation of retainer ring 140′ under influence of the manually rotatable worm gear 151. Since vane positioning ring 139′ is keyed through the previously-described helical keyways 148 and 149 to sliding ring 141′, such sliding ring will move in the opposite direction to that of vane positioning ring 139′, thereby retaining contact at tapered surfaces 147′ and 148′ as the vanes 136 are raised or lowered to obtain the desired clearance or contact with housing race 130.

Where the above-described manual adjustment feature is employed, it should be understood that the same must be provided on both housing sections 131 and 132 to achieve proper alignment of the vanes 136, and only one manual adjustment unit has been illustrated at the right-hand side of FIGURE 13 for purpose of simplification and to avoid a multiplicity of views which are almost identical. Likewise, when the adjustment feature is not employed, the assembly 138 shown at the left-hand side of FIGURE 13 will be duplicated exactly on the opposite side of the machine in conjunction with housing section 132. The construction will be identical whether the vanes of the rotary machine reciprocate radially relative to the machine rotor, as in an air compressor, or whether they are of the non-reciprocating type as in a blower or the like. The rotary tapered sleeve bearing 142 has a frictionless connection with the non-rotary sliding ring 141 through the medium of balls or the like as indicated at 153.

If thermal expansion tends to cause excessive pressure between the tips of vanes 136 and housing race 130, the coefficient of friction between the rotating vanes and vane positioning ring 139 at tapered face 150 will be increased, causing vane positioning ring 139 to move axially outwardly as it backs off on the engaging tapered faces of the teeth 143 and 144. At the same time, this forces sliding ring 141 to which ring 139 is helically keyed to shift axially inwardly, FIGURE 13. Thus, at all times during operation at rated speed, positive controlled contact between vanes 136 and housing race 130 is automatically maintained. Also, when the rotary machine is operating at speeds lower than rated r.p.m., the vane positioning ring 139 will still maintain the radial vanes 136 in positive contact with the housing race due to the coefficient of friction at tapered surface 150. The recesses at the opposite ends of the vanes 136 providing tapered faces 147 and 150 are preferably rounded as shown in FIGURE 17 to reduce friction where the vanes engage the elements 139 and 142 to provide substantially a line contact between the vanes and said elements.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. In a rotary internal combustion engine or the like, a stator housing having an internal race which is arcuate in cross section, a rotor within said stator housing to turn therein and having a substantially radial passage, a vane unit disposed movably within said radial passage, said vane unit comprising a two-part intermediate vane body and outer and inner shoe elements formed separately from the vane body, said outer shoe element provided with slots radially thereof, the bottoms of said slots being alternately inclined to the axis of said rotor and to the axis of the vane unit, inserts disposed movably within said slots and having inclined edges slidably engaging the inclined bottoms of said slots and arcuate edge portions engageable with said race, said inner shoe element having a pair of inclined faces on opposite sides thereof disposed at an angle to the rotor axis, a first pair of rings carried by the stator housing inwardly of said vane unit and each having an inclined face engaging one inclined face of the inner shoe element and a multiplicity of tapered projections extending circumferentially thereof, and a coacting pair of rings fixedly secured to the stator housing adjacent said first pair of rings and having a multiplicity of circumferentially spaced tapered projections interfitting with the first-named projections.

2. Self-adjusting automatically compensating sealing means for rotary machines comprising a stator housing having an internal race, a rotor for rotation within the stator housing and having a movable rotor vane conforming to the cross sectional shape of said race and adapted to positively seal the race during rotation, said rotor vane having an inclined surface disposed at an angle to the axis of said rotor, coacting axially shiftable tapered ring means engageable with the inclined surface of the rotor vane to shift the latter toward contact with the race, said coacting tapered ring means provided on one face thereof with circumferentially extending tapered teeth, and another ring secured to the stator housing adjacent said coacting ring and having circumferentially extending tapered teeth interfitting with the tapered teeth of said coacting ring, whereby rotation of the rotor causes the interfitting tapered teeth to maintain the coacting axially shiftable tapered ring means in active engagement with said inclined surface of the rotor vane.

3. Self-adjusting automatically compensating sealing means for rotary machines comprising a stator having an internal race, a rotor for rotation relative to the stator and having a movable vane unit adapted to sealingly engage said race during rotation, said vane unit having inclined surface parts, coacting inclined surface elements engaging said inclined surface parts and shiftable relative thereto for causing the vane unit to move into positive sealing contact with said race, and friction means operable in response to the turning of said rotor to actuate said coacting inclined surface elements, said friction means comprising circumferentially extending interfitting tapered teeth on said coacting inclined surface elements, and additional parts secured to the stator and having circumferentially extending tapered teeth interfitting with the aforementioned teeth.

4. In a rotary machine having a stator housing including substantially flat parallel end walls and a rotor to turn within the stator housing and having end walls in close proximity to the stator housing end walls, sealing means for said end walls comprising pairs of annular ring elements disposed adjacent the opposed end walls of the rotor and stator housing, one ring element of each pair being held against rotation and the other ring element of each pair being turnable at least a limited amount, and tapered interengaging friction surface elements on each pair of ring elements operating in response to rotor rotation for separating the ring elements of each pair axially and thereby maintaining automatically a desired contact pressure between one ring element of each pair and one relatively movable part of the rotary machine.

5. Sealing means for rotary machines comprising a stator housing having a race, a rotor to turn with respect to the stator housing, radial vane means carried by said rotor for engagement with the race during rotation of the rotor, tapered interengaging means operated in response to rotation of the rotor for maintaining the vane means in positive sealing engagement with said race and being self-adjusting for wear, thermal changes and the effective forces on the vane means, said rotor and stator housing having opposed end walls, a floating seal ring having a face frictionally engaging an end wall of the rotor and provided upon its opposite face with tapered teeth extending circumferentially thereof, and a coacting retainer ring fixed to the stator housing and having a plurality of tapered teeth on one side thereof interfitting with the tapered teeth of said floating seal ring.

References Cited in the file of this patent

UNITED STATES PATENTS

| | | |
|---|---|---|
| 694,763 | Liethegener et al. | Mar. 4, 1902 |
| 1,319,614 | Pierce | Oct. 21, 1919 |
| 1,350,231 | McFarland | Aug. 17, 1920 |
| 2,027,594 | Huff | Jan. 14, 1936 |
| 2,468,451 | Kutzner | Apr. 26, 1949 |
| 2,479,685 | Ingwer | Aug. 23, 1949 |
| 2,522,824 | Hicks | Sept. 19, 1950 |
| 2,588,342 | Bidwell | Mar. 11, 1952 |